(12) United States Patent
Iseki

(10) Patent No.: US 7,187,737 B2
(45) Date of Patent: Mar. 6, 2007

(54) DATA TRANSMITTING UNIT, DATA COMMUNICATING APPARATUS AND DATA COMMUNICATING METHOD

(75) Inventor: Yukimasa Iseki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 801 days.

(21) Appl. No.: 10/288,545

(22) Filed: Nov. 6, 2002

(65) Prior Publication Data

US 2003/0095618 A1 May 22, 2003

(30) Foreign Application Priority Data

Nov. 20, 2001 (JP) .............................. 2001-355319
Oct. 9, 2002 (JP) .............................. 2002-296124

(51) Int. Cl.
*H04L 7/00* (2006.01)
(52) U.S. Cl. ...................... 375/354; 370/304; 370/503; 370/516; 327/141
(58) Field of Classification Search ................ 327/141; 358/296; 370/516, 304, 503; 375/371; 706/41
See application file for complete search history.

(56) References Cited

U.S. PATENT DOCUMENTS 3,613,084 A * 10/1971 Armstrong .................... 706/41
5,162,917 A * 11/1992 Sugishima ................... 358/296
5,533,072 A * 7/1996 Georgiou et al. ............ 375/371
5,764,648 A * 6/1998 Yamane et al. ............. 370/516
6,140,850 A * 10/2000 Inoue .......................... 327/141

FOREIGN PATENT DOCUMENTS

JP         2001-180042       7/2001
RU         2 116 001         7/1998

* cited by examiner

*Primary Examiner*—Mohammad Ghayour
*Assistant Examiner*—Adolf DSouza
(74) *Attorney, Agent, or Firm*—Fitzpatrick, Cella, Harper & Scinto

(57) ABSTRACT

In a transmitting apparatus 101, there are provided PLL circuit 601 for generating high-speed clock signals up to $2^m$ times (m being a positive integer) from a basic clock signal, and a clock generating circuit 600 for generating a communication clock signal (S-CLOCK) and a reception timing signal (S-LATCH*) as independent clocks of any time length with using the generated high-speed clock signal as the smallest unit.

15 Claims, 11 Drawing Sheets

FIG. 3

TABLE 1

701

| ADD | DATA | ADD | DATA | ADD | DATA | ADD | DATA | ADD | DATA |
|---|---|---|---|---|---|---|---|---|---|
| 0 | 1 | 32 | 1 | 64 | 1 | 96 | 1 | 128 | 1 |
| 1 | 1 | 33 | 1 | 65 | 1 | 97 | 1 | 129 | 1 |
| 2 | 1 | 34 | 1 | 66 | 1 | 98 | 1 | 130 | 1 |
| 3 | 1 | 35 | 1 | 67 | 1 | 99 | 1 | 131 | 1 |
| 4 | 1 | 36 | 1 | 68 | 1 | 100 | 1 | 132 | 1 |
| 5 | 1 | 37 | 1 | 69 | 1 | 101 | 1 | 133 | 1 |
| 6 | 1 | 38 | 1 | 70 | 1 | 102 | 1 | 134 | 1 |
| 7 | 1 | 39 | 1 | 71 | 1 | 103 | 1 | 135 | 1 |
| 8 | 0 | 40 | 0 | 72 | 0 | 104 | 0 | 136 | 0 |
| 9 | 0 | 41 | 0 | 73 | 0 | 105 | 0 | 137 | 0 |
| 10 | 0 | 42 | 0 | 74 | 0 | 106 | 0 | 138 | 0 |
| 11 | 0 | 43 | 0 | 75 | 0 | 107 | 0 | 139 | 0 |
| 12 | 0 | 44 | 0 | 76 | 0 | 108 | 0 | 140 | 0 |
| 13 | 0 | 45 | 0 | 77 | 0 | 109 | 0 | 141 | 0 |
| 14 | 0 | 46 | 0 | 78 | 0 | 110 | 0 | 142 | 0 |
| 15 | 0 | 47 | 0 | 79 | 0 | 111 | 0 | 143 | 0 |
| 16 | 1 | 48 | 1 | 80 | 1 | 112 | 1 | 144 | 1 |
| 17 | 1 | 49 | 1 | 81 | 1 | 113 | 1 | 145 | 1 |
| 18 | 1 | 50 | 1 | 82 | 1 | 114 | 1 | 146 | 1 |
| 19 | 1 | 51 | 1 | 83 | 1 | 115 | 1 | 147 | 1 |
| 20 | 1 | 52 | 1 | 84 | 1 | 116 | 1 | 148 | 1 |
| 21 | 1 | 53 | 1 | 85 | 1 | 117 | 1 | 149 | 1 |
| 22 | 1 | 54 | 1 | 86 | 1 | 118 | 1 | 150 | 1 |
| 23 | 1 | 55 | 1 | 87 | 1 | 119 | 1 | 151 | 1 |
| 24 | 0 | 56 | 0 | 88 | 0 | 120 | 0 | 152 | 0 |
| 25 | 0 | 57 | 0 | 89 | 0 | 121 | 0 | 153 | 0 |
| 26 | 0 | 58 | 0 | 90 | 0 | 122 | 0 | 154 | 0 |
| 27 | 0 | 59 | 0 | 91 | 0 | 123 | 0 | 155 | 0 |
| 28 | 0 | 60 | 0 | 92 | 0 | 124 | 0 | 156 | 0 |
| 29 | 0 | 61 | 0 | 93 | 0 | 125 | 0 | 157 | 0 |
| 30 | 0 | 62 | 0 | 94 | 0 | 126 | 0 | 158 | 0 |
| 31 | 0 | 63 | 0 | 95 | 0 | 127 | 0 | 159 | 0 |

FIG. 4

TABLE 2

| ADD | DATA | ADD | DATA | ADD | DATA | ADD | DATA | ADD | DATA |
|---|---|---|---|---|---|---|---|---|---|
| 0 | 1 | 32 | 0 | 64 | 1 | 96 | 1 | 128 | 0 |
| 1 | 1 | 33 | 0 | 65 | 1 | 97 | 1 | 129 | 0 |
| 2 | 1 | 34 | 0 | 66 | 1 | 98 | 1 | 130 | 0 |
| 3 | 1 | 35 | 0 | 67 | 1 | 99 | 1 | 131 | 0 |
| 4 | 1 | 36 | 0 | 68 | 1 | 100 | 1 | 132 | 0 |
| 5 | 1 | 37 | 0 | 69 | 1 | 101 | 1 | 133 | 0 |
| 6 | 1 | 38 | 1 | 70 | 1 | 102 | 1 | 134 | 1 |
| 7 | 1 | 39 | 1 | 71 | 1 | 103 | 1 | 135 | 1 |
| 8 | 1 | 40 | 1 | 72 | 0 | 104 | 1 | 136 | 1 |
| 9 | 0 | 41 | 1 | 73 | 0 | 105 | 0 | 137 | 1 |
| 10 | 0 | 42 | 1 | 74 | 0 | 106 | 0 | 138 | 1 |
| 11 | 0 | 43 | 1 | 75 | 0 | 107 | 0 | 139 | 1 |
| 12 | 0 | 44 | 1 | 76 | 0 | 108 | 0 | 140 | 1 |
| 13 | 0 | 45 | 0 | 77 | 0 | 109 | 0 | 141 | 0 |
| 14 | 0 | 46 | 0 | 78 | 0 | 110 | 0 | 142 | 0 |
| 15 | 0 | 47 | 0 | 79 | 0 | 111 | 0 | 143 | 0 |
| 16 | 0 | 48 | 0 | 80 | 1 | 112 | 0 | 144 | 0 |
| 17 | 0 | 49 | 0 | 81 | 1 | 113 | 0 | 145 | 0 |
| 18 | 1 | 50 | 0 | 82 | 1 | 114 | 1 | 146 | 0 |
| 19 | 1 | 51 | 0 | 83 | 1 | 115 | 1 | 147 | 0 |
| 20 | 1 | 52 | 1 | 84 | 1 | 116 | 1 | 148 | 1 |
| 21 | 1 | 53 | 1 | 85 | 1 | 117 | 1 | 149 | 1 |
| 22 | 1 | 54 | 1 | 86 | 1 | 118 | 1 | 150 | 1 |
| 23 | 1 | 55 | 1 | 87 | 1 | 119 | 1 | 151 | 1 |
| 24 | 1 | 56 | 1 | 88 | 0 | 120 | 1 | 152 | 1 |
| 25 | 1 | 57 | 1 | 89 | 0 | 121 | 1 | 153 | 1 |
| 26 | 1 | 58 | 0 | 90 | 0 | 122 | 1 | 154 | 0 |
| 27 | 1 | 59 | 0 | 91 | 0 | 123 | 1 | 155 | 0 |
| 28 | 0 | 60 | 0 | 92 | 0 | 124 | 0 | 156 | 0 |
| 29 | 0 | 61 | 0 | 93 | 0 | 125 | 0 | 157 | 0 |
| 30 | 0 | 62 | 0 | 94 | 0 | 126 | 0 | 158 | 0 |
| 31 | 0 | 63 | 0 | 95 | 0 | 127 | 0 | 159 | 0 |

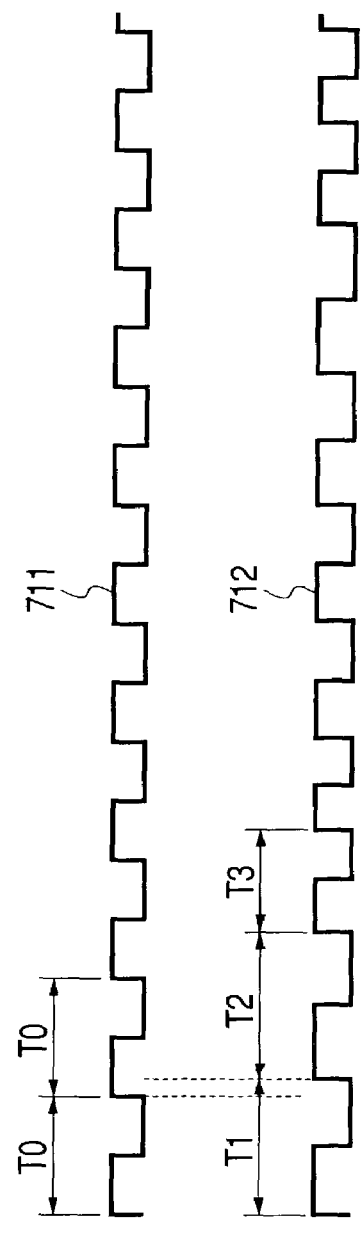

TABLE 1

TABLE 2

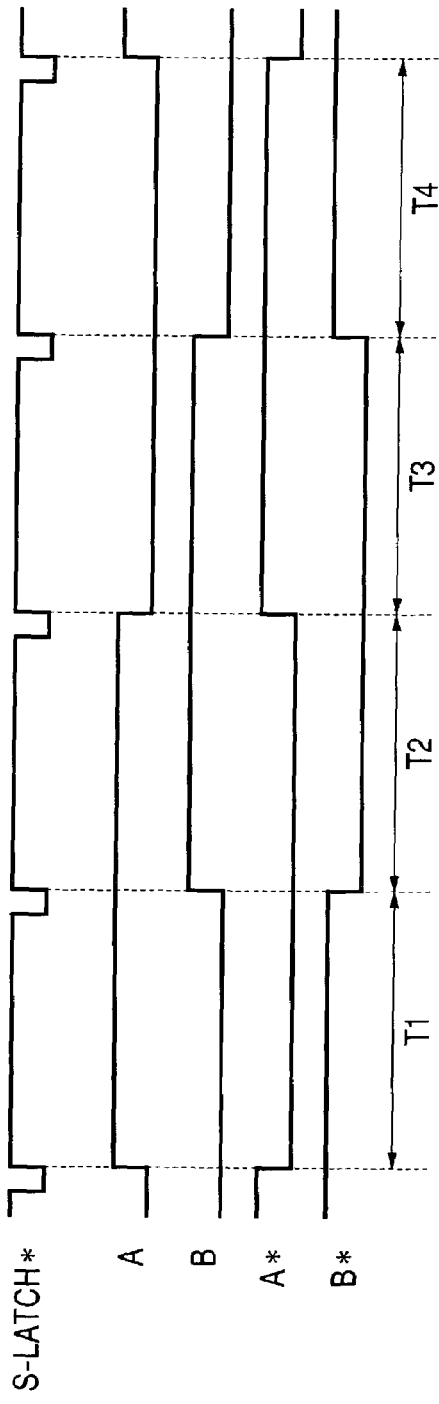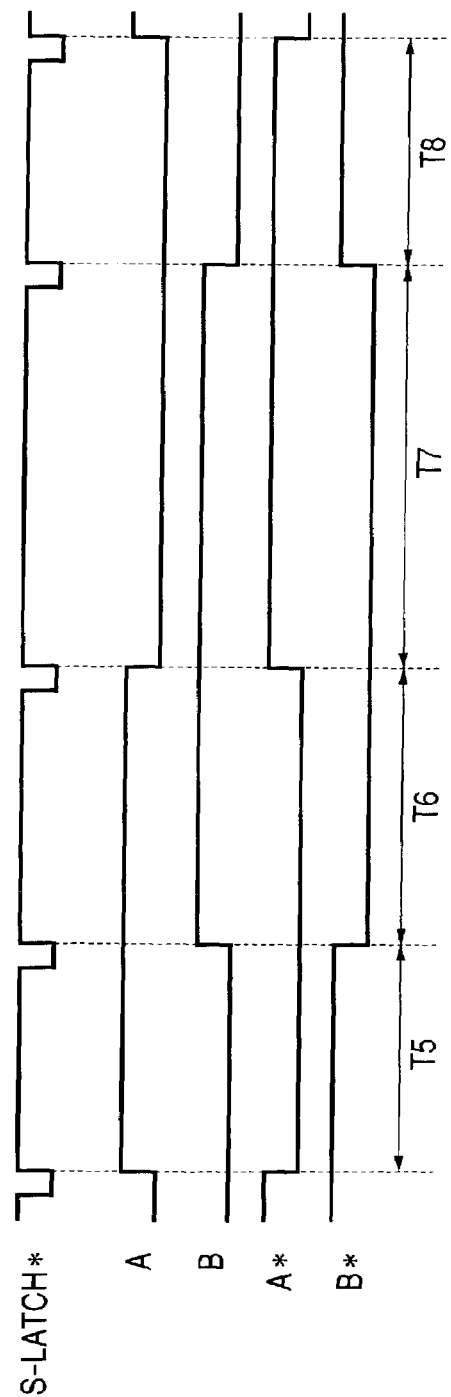

DATA TRANSMITTING UNIT, DATA COMMUNICATING APPARATUS AND DATA COMMUNICATING METHOD

BACKGROUND OF THE INVENTION

1. Field of the Invention

This invention relates to a data communicating apparatus for and a data communicating method of transmitting a plurality of data by serial communication.

2. Related Background Art

In various machines, the exchange of data is effected between apparatuses present in the interior of the machine, and with the tendency toward a larger scale of the machines, the quantity of data to be treated is also in a tendency toward increase. When data are on one and the same substrate, it is also possible to effect the exchange of the data by an ordinary bus form. However, when the exchange of data in the bus form is to be effected by using bundle lines or the like between discrete substrates, the number of the bundle lines becomes enormous. At a location which does not require a high data transfer speed, there is known a method of curtailing the number of bundle lines by means of serial exchange of data.

As serial communications, there exist various systems such as the clock synchronizing type communication for effecting communication while adding a serial transfer clock, and non-synchronizing communication which does not add a clock. The communication system which does not add a clock has the great advantage that it can decrease the number of bundle lines. In contrast, in the clock synchronizing type communication, a circuit such as a synchronizing circuit is not necessary on the receiving side and therefore, the circuit construction becomes simple, and this leads to the advantage that the whole can be constructed inexpensively. Also, in an apparatus such as a copying machine or a printer, a stepping motor therein is supplied with a driving pulse at each predetermined time interval to thereby control the rotation of the motor. So, by making design such that serial data are received at a predetermined cycle, it becomes possible to rotate the stepping motor in serial communication without making the scale of the circuit large.

(Example of the Conventional Serial Communication)

Here, an example of the conventional serial communication will be described with reference to FIGS. 7 to 12A and 12B of the accompanying drawings.

FIG. 7 shows the internal circuit of a conventional transmitting unit 200. The control of the transmitting unit 200 is effected by a control CPU 201. The CPU has connected thereto a ROM memory 202 as a program storing device and a RAM memory 203. S-CLOCK as a communication clock signal is supplied by a CLOCK 207, and several circuits in the transmitting unit 200 operate in synchronism with the clock from the CLOCK 207. A parallel/serial conversion circuit 206 exists in order to generate S-DATA as a serial data signal. The data to this converter is supplied from the CPU through a latch circuit 204. At a point of time whereat the CPU has determined to start communication, the loading of the data to the parallel/serial conversion circuit is effected. Actually, a signal (hereinafter referred to as the transmission starting original signal) which is generated from the port of the CPU, and synchronized with the clock from the CLOCK 207 in a SYNC circuit 208 is used to start the loading.

As shown in FIG. 8, the SYNC circuit 208 is a timing circuit for detecting a falling edge of the signal inputted through an input portion In, and generating an "L" signal of one clock synchronized with an inputted clock signal. S-LATCH* as a reception timing signal is generated by a down counter circuit 209. The start of down count, like the parallel/serial conversion circuit 206, is synchronized with the output of the SYNC circuit 208. The internal delay number (the delay of clock up to a data latch portion) of a receiving unit 102, which will be described later, is added to the effective bit number of serial communication data set by the latch circuit 204 and the sum is set as the load value of down count from the CPU through a latch circuit 205. Thereby, the reception decision timing on the receiving unit 400 side of FIG. 9 can be changed, and even when the circuit of the receiving unit is changed, the change can be easily coped with.

FIG. 9 shows the internal circuit of the receiving unit 400. In synchronizing type communication, a clock is also transferred at the same time and therefore, in reception, an inherent clock is not particularly required. In the receiving unit 400, there exist a serial/parallel conversion circuit 402 for converting serial data into parallel data, and a latch circuit 403 for latching the parallel data. S-DATA is transmitted in synchronism with the rising edge of S-CLOCK and therefore, on the receiving unit 400 side, the inputted S-CLOCK is inverted by an inverting circuit 401 and is used as an operating clock in the serial/parallel conversion circuit 402. As a result, the S-CLOCK is received at the falling edge thereof, whereby the degree of superfluity to the delay of transmission by a communication line is increased. The latch circuit 403 is adapted to decide (or latch) the parallel data from the serial/parallel conversion circuit 402 at the rising of S-LATCH*.

FIG. 10 shows an example of the communication when use is made of the transmitting unit 200 of FIG. 7 and the receiving unit 400 of FIG. 9. Here, the effective bit number of communication data is 8 bits, and data to be transmitted is defined as D1[7:0], and data already decided on the receiving unit 400 side is defined as D0[7:0]. In synchronism with the rising of S-CLOCK, the data D1 is transmitted sequentially from 0 bit. LSB first or MSB first may be either. The circuit in the serial/parallel conversion circuit 402 in the receiving unit 400 only changes. As soon as the data D1[7] of the 8th bit is transferred, S-LATCH* becomes "L" by one clock. In the receiving circuit shown in FIG. 9, this becomes simultaneous with D1[7] because the internal delay does not occur. In synchronism with the rising of S-LATCH*, the data is changed from D0[7:0] to D1[7:0]. The change timing of the data depends on S-LATCH*. This S-LATCH* is outputted from the port output of the CPU 201 with shifting by a predetermined time corresponding to a down count value set by the down counter 209. As a result, design is made such that if the CPU generates the transmission starting original signal (reception timing signal) at each predetermined timing, data output can be renewed also at each predetermined timing.

Generally, in serial communication, the more increased is the amount of data transmitted, the longer becomes the communication time. To suppress such a problem, the transfer speed (in the case of the clock synchronizing type communication, the transfer clock frequency) of communication is increased and the time required for the transfer is suppressed to a short time. However, in the clock synchronizing type communication wherein a clock signal is transmitted via a bundle line, an increase in the frequency of the transfer clock leads to the aggravation of radiant electric wave noise. As a method of suppressing the radiant electric wave (or EMI) occurring from a clock, there is known a noise countermeasure technique using an SSCG (spread spectrum clock generator). This technique generates a clock while modulating a frequency at a constant width, and is a technique very effective when no problem is posed in the case of the modulation of a minute sectional width.

FIG. 11 shows the main body construction of a conventional digital composite machine, and the above-noted problem will hereinafter be described in detail with respect to a digital copying machine as an image forming apparatus taken as an example. An original transporting portion 130 is constructed as follows. Originals set on an original placing stand 131 are transported one by one to an original reading position by feed rollers 132. In the original reading position, the original is disposed at a predetermined position by an original transporting belt 137 driven by a motor 136 and the original reading operation is performed by an original reading portion 120. After the original reading operation, the transporting path is changed by a flapper 135, and the motor 136 is reversed in rotation, whereby the original is delivered to a delivery tray 138.

An original reading portion 120 is constructed as follows. An exposure lamp 122 comprises a fluorescent lamp, a halogen lamp or the like, and irradiates the original on an original supporting glass plate (original stand) 126 while moving in a direction perpendicular to the lengthwise direction thereof. The scattered light from the original by the irradiation by the exposure lamp 122 is reflected by first and second mirror stands 121 and 123 and arrives at a lens 124. At this time, the second mirror stand 123 is moved at a speed of ½ relative to the movement of the first mirror stand 121, and the distance from the irradiated original surface to the lens 124 is always kept constant. The first mirror stand 121 and the second mirror stand 123 are moved by a reading motor 125. The image on the original is imaged on the light receiving portion of a CCD line sensor 127 comprising thousands of light receiving elements line-arranged, through the intermediary of the mirror stands 121, 123 and the lens 124, and is sequentially photoelectrically converted in units of line by the CCD line sensor 127. The photoelectrically converted signal is processed by a signal processing portion, not shown, and is PWM-modulated and outputted.

An image forming portion 100 is constructed as follows. An exposure control portion drives a semiconductor laser 50 on the basis of a PWM-modulated image signal which is the output of the signal processing portion, and applies a light beam to the surface of a photosensitive member 52 being rotated at a constant speed. At this time, the light beam is deflected and scanned by the use of a polygon mirror 51 being rotated in parallel to the axial direction of the drum-shaped photosensitive member 52 by a motor 54. The photosensitive member 52, before the light beam is applied thereto, has its residual charges eliminated by a pre-exposure lamp, not shown, and has its surface uniformly charged by a primary charger, not shown. Accordingly, the photosensitive member 52 receives the light beam while being rotated, whereby an electrostatic latent image is formed on the surface of the drum. The electrostatic latent image on the surface of the drum is then visualized with a developer (toner) of a predetermined color by a developing device 53.

Transfer paper transported from a transfer paper feeding stage 140, 150, 160, 170 or 180 is transported to registration rollers 55. The registration rollers 55 detects the arrival of the transfer paper by the use of a sensor 56, and feeds the transfer paper to a transferring position while watching the timing between the leading edge of the image formed on the photosensitive member 52 and the leading edge of the transfer paper. The reference numeral 57 designates a transfer charger which transfers the developed toner image on the photosensitive member 52 to the fed transfer paper. After the transfer, the photosensitive member 52 has any residual toner thereon removed by a cleaner, not shown. The transfer paper after the transfer of the image thereto has been finished is easy to separate from the photosensitive member 52 because the curvature of the photosensitive member 52 is great, but a voltage is applied to a charge eliminating needle, not shown, to thereby weaken the attraction between the photosensitive member 52 and the transfer paper and facilitate the separation.

The thus separated transfer paper is sent to a fixing portion 58, where toner thereon is fixed. The reference numeral 110 denotes a ceramic heater comprised of film 111 and two rollers, and the heat of the ceramic heater 110 is efficiently transmitted through the thin film 111. A cooling roller radiates the heat of the rollers of the fixing portion. A feed roller is comprised of a large roller and two small rollers, and feeds the transfer paper from the fixing portion and also corrects the curl of the transfer paper.

A direction flapper 112 changes over the destination of delivery of the transfer paper between a tray 114 and a transporting unit 190 in conformity with the operating mode. The transporting unit 190 is constructed as follows. This is a unit for transporting the transfer paper to a post-treating apparatus 10 which will be described later, and transports the transfer paper by transport rollers 191. The reference numerals 140, 150, 160 and 170 designate main body feeding stages comprised of the same mechanism. The reference numeral 180 denotes a deck feeding stage which can accumulate thereon a larger quantity of transfer paper than the main body feeding stages 140, 150, 160 and 170. The main body feeding stages 140, 150, 160 and 170 assume substantially the same construction and therefore, the construction of the main body feeding stage 140 will be taken as an example and described. On the bottom surface of a cassette 141 for accumulating and containing the transfer paper therein, there is disposed a bottom plate 142 moved up and down by a lift-up motor 143. This bottom plate 142 is moved up, whereby the transfer paper can stand by at a predetermined standby height. The transfer paper standing by at a predetermined position is transported to a pair of feed rollers 145 by the use of a pick-up roller 144. The pair of feed rollers 145 have torque applied thereto in a rotational direction opposite to the feeding direction, thereby feeding the transfer paper to a transport path one by one while preventing the double feeding of the recording mediums. Also, the pair of transport rollers 146 are a pair of rollers for further upwardly transporting the transfer paper transported from the feeding stages underlying the main body feeding stage 140. A feed motor 147 is a motor for driving the pair of feed rollers 145 and the pair of transport rollers 146.

The deck feeding stage 180 is constructed as follows. Also on the bottom surface of a paper container 181 for accumulating and containing the transfer paper therein, there is disposed a bottom plate 182 for moving up the transfer paper to the standby position. The bottom plate 182 is connected to a belt rotated by a motor 183, and by the belt being moved, the upward movement and downward movement of the bottom plate 182 are controlled. The transfer paper being at the standby position is transported to a pair of feed rollers 184 by a pick-up roller 185, and as in the case of the main body feeding, the transfer paper is transported to a transport path while the doubling feeding thereof is prevented. A feed motor 187 is a motor for driving the pair of feed rollers 184.

The post-treating apparatus 10 is constructed as follows. The post-treating apparatus 10 receives the transfer paper from the image forming portion 100 by rollers 32. When a tray 14 is selected as the output destination of the received transfer paper, the transport direction is changed over by a flapper 33 and the transfer paper is delivered to the tray 14 by the use of rollers 34. The tray 14 is a delivery tray temporarily used as the destination of delivery in the treatment effected while interrupting the ordinary processing.

A tray 18 and a tray 19 are trays for ordinary delivery. The transfer paper can be delivered to these trays by the transport path being downwardly changed over by the flapper 33, and thereafter the transport path being selected toward rollers 16 by a flapper 30. When the transport path is vertically downwardly selected by flappers 30 and 31 and the transport direction is reversed by reversing rollers 15, reverse delivery is possible. During the delivery to these trays 18 and 19, stapling using a stapler 17 is possible. Also, the selection of the tray 18 or the tray 19 as the output destination of the transfer paper is effected by moving up and down the tray itself by the use of a shift motor 20.

A tray 27 is a delivery tray for use during binding. The transfer paper is transported from the rollers 15 to rollers 21 and a predetermined quantity of transfer papers are accumulated in a primary accumulating portion 23. After the termination of the accumulation, binding work is done by a stapler 24, and the direction of a flapper 25 is changed and rollers 22 are rotated in a direction opposite to that during the accumulation, and the transfer paper is delivered to the tray 27 via rollers 26.

When the simplification of an interface is taken into consideration when the image forming portion 100, the original reading portion 120, the main body feeding stage 140, etc. and the deck feeding stage 180 are designed to be separable from each other, the connecting method by serial communication is general. In this case, various motors, e.g. the reading motor 125 and the feed motor 147 are controlled by serial communication from a control device, not shown, in the image forming apparatus 100.

Also, when as described above, the communication clock is subjected to SSCG modulation in order to reduce radiation noise, if each motor has a control device attached thereto (for example, a DC brushless outer rotor motor), no problem will arise regarding the driving accuracy thereof, but in the case of stepping motors often used in recent years, there are problems which must be considered regarding accuracy.

FIGS. 12A and 12B show the changeover of the excitation pattern of a stepping motor in synchronizing type serial communication using S-LATCH*. When SSCG is not used, a communication clock period which is the reference is the same and therefore, the renewal timing of S-LATCH* is constant. As a result, the frequency which is the rotational speed of the stepping motor becomes constant.

$1/T1 = 1/T2 = 1/T3 = 1/T4$

When SSCG is used, the communication clock which is the reference fluctuates and therefore, the renewal timing of S-LATCH* becomes irregular. As a result, the frequency of the stepping motor varies irregularly.

$1/T1 \neq 1/T2 \neq 1/T3 \neq 1/T4$:  state expression I $1/T3 < 1/T2 < 1/T1 < 1/T4$:  state expression II The following two problems are mentioned as the problems when SSCG is used for the driving of the stepping motor of the digital composite machine of FIG. 11.

(1) Deterioration of the Image

The reading of an image is effected at a predetermined magnification by the reading motor 125 driving the first and second mirror stands 121 and 123 at a constant speed. In the contrary to this condition, when the speed is not constant in case of the state expression I as shown in FIG. 12B, the image read becomes a bad image which repeats expansion and contraction.

(2) Bad Paper Transport (Bad Motor Driving)

High torque is required of the feed motor 147 and therefore, there are many cases where the operating frequency and the step-out frequency have no surplus. If in such cases, the speed varies as in the state expression II, the step-out frequency will be exceeded at 1/T4, and there will come out the possibility of the motor being de-coupled and stopped. To avoid this, great limitations will come out in the frequency range of SSCG, the selection of the torque of the motor, etc.

SUMMARY OF THE INVENTION

According to the present invention, in a transmitting apparatus, provision is made of a timing signal generating portion (clock generating circuit 600) for generating a communication clock signal (S-CLOCK) and a reception timing signal (S-LATCH*) as independent clocks of any time length with using a generated high-speed clock signal (reference clock) as the smallest unit. Therefore, the generated clock can be controlled so as to become a constant clock number if seen at the decision timing period of data transfer, whereby even in serial communication in which on a receiving apparatus side, it is necessary to vary output data at a predetermined time interval and which uses a clock of which the frequency fluctuates, it becomes possible to obtain a data output at desired constant timing on the receiving apparatus side, and highly efficient serial communication can be realized. Also, the generation of clock data can be simply accomplished by hardware.

Also, in a transmitting apparatus for effecting synchronizing type serial data communication, provision is made of a high-speed clock generating portion (PLL circuit 601) for generating high-speed clock signals up to $2^m$ times (m being a positive integer) on the basis of a basic clock signal and therefore, a communication clock signal for transmission (S-CLOCK) can be generated so that the frequency thereof may fluctuate, whereby radiant electric wave noise occurring in clock synchronizing type serial communication can be reduced by a simple circuit construction, and always stable serial communication suffering little from errors can be effected.

Further, when in a construction wherein the above-described transmitting apparatus and receiving apparatus are incorporated into an image forming apparatus, for example, a stepping motor is adopted as a load, it comes not to happen that the modulation of the frequency affects the rotation itself of the stepping motor, whereby an image of high quality can be formed by image processing.

In an embodiment of the present invention, there is provided a data transmitting apparatus in which a communication clock signal for the transmission of data and a reception timing signal by which a receiving apparatus receives this data are synchronized with each other and effect synchronizing type serial data communication. The apparatus has a reference clock generating portion for generating a reference clock signal, and a timing signal generating portion for generating the communication clock signal and the reception timing signal on the basis of the reference clock signal. The timing signal generating portion generates the communication clock signal and the reception timing signal as independent clocks of any time length with using the reference clock signal as the smallest unit, and is controlled so that the reception timing signal may be provided with a plurality of constant clocks in one period thereof and at least one of the plurality of clocks is controlled so as to become a clock differing in period.

Also, an apparatus for transmitting a plurality of data by serial communication is provided with a high-speed clock generating portion for generating high-speed clock signals up to $2^m$ times (m being a positive integer) on the basis of a basic clock signal by the use of a communication clock signal for transmission, a serial communication data signal synchronized with the communication clock signal, and a reception timing signal indicative of the reception timing of the communication data signal, and a timing signal generating portion for generating the communication clock signal and the reception timing signal as independent clocks of any time length with using the generated high-speed clock signal as the smallest unit. When the period of the basic clock signal is defined as Torg, and the period of the reception timing signal is defined as Tref, and the period of the communication clock signal is defined as Ti, the reception timing signal is outputted when the basic clock signal has been counted n times, and is represented as $$n = \frac{Tref}{Torg},$$

and the period Ti of the communication clock signal is represented as $$Ti = Torg\left(1 + \frac{ki}{2^m}\right);$$

ki being an integer, by adding or subtracting the period of a plurality of the generated high-speed clock signals to or from the period Torg of the basic clock signal, and the total of the added or subtracted time, when seen through one period of the reception timing signal, is chosen so as to become 0 as represented by $$0 = \sum_{i=1}^{n} ki,$$

whereby the communication clock generating portion constitutes a data communication apparatus.

Also, the apparatus of the present invention is characterized in that a limit value is provided for the ki value determining the addition or subtraction of the high-speed clocks so that the ratio between the period Ti of the communication clock signal and the period Torg of the basic clock signal may not be below a predetermined reference value.

As regards the communication clock signal, the time S from the rising edge thereof to the falling edge thereof is constant as $$S = \frac{Torg}{2},$$

and the time varied by the ki value determining the addition or subtraction of the high-speed clocks may be restricted to the time from the falling edge to the rising edge.

The relation among the period Torg of the basic clock signal, the period Tref of the reception timing signal and the period Ti of the communication clock signal may be stored as a data pattern in a storing portion.

Also, the present invention provides an image forming apparatus having a transmitting apparatus and a receiving apparatus, and capable of transmitting a plurality of data between the apparatuses by serial communication, and characterized in that the transmitting apparatus includes the above-described data communication apparatus, and the receiving apparatus receives a serial data signal transmitted from the transmitting apparatus by the use of the reception timing signal transmitted from the data communication apparatus to thereby constitute an image forming apparatus. Other objects and features of the present invention will become apparent from the following description and the accompanying drawings.

BRIEF DESCRIPTION OF THE DRAWINGS

FIG. 3 is an illustration of an example of Table 1 of a data pattern stored in a memory.

FIG. 4 is an illustration of an example of Table 2 of the data pattern stored in the memory.

FIGS. 5A and 5B are waveform graphs showing the waveforms of a communication clock signal S-CLOCK in the cases of Table 1 and Table 2.

FIGS. 12A and 12B show the changeover of the excitation pattern of a stepping motor in synchronizing type serial communication using S-LATCH*.

DESCRIPTION OF THE PREFERRED EMBODIMENT

Figure 1:
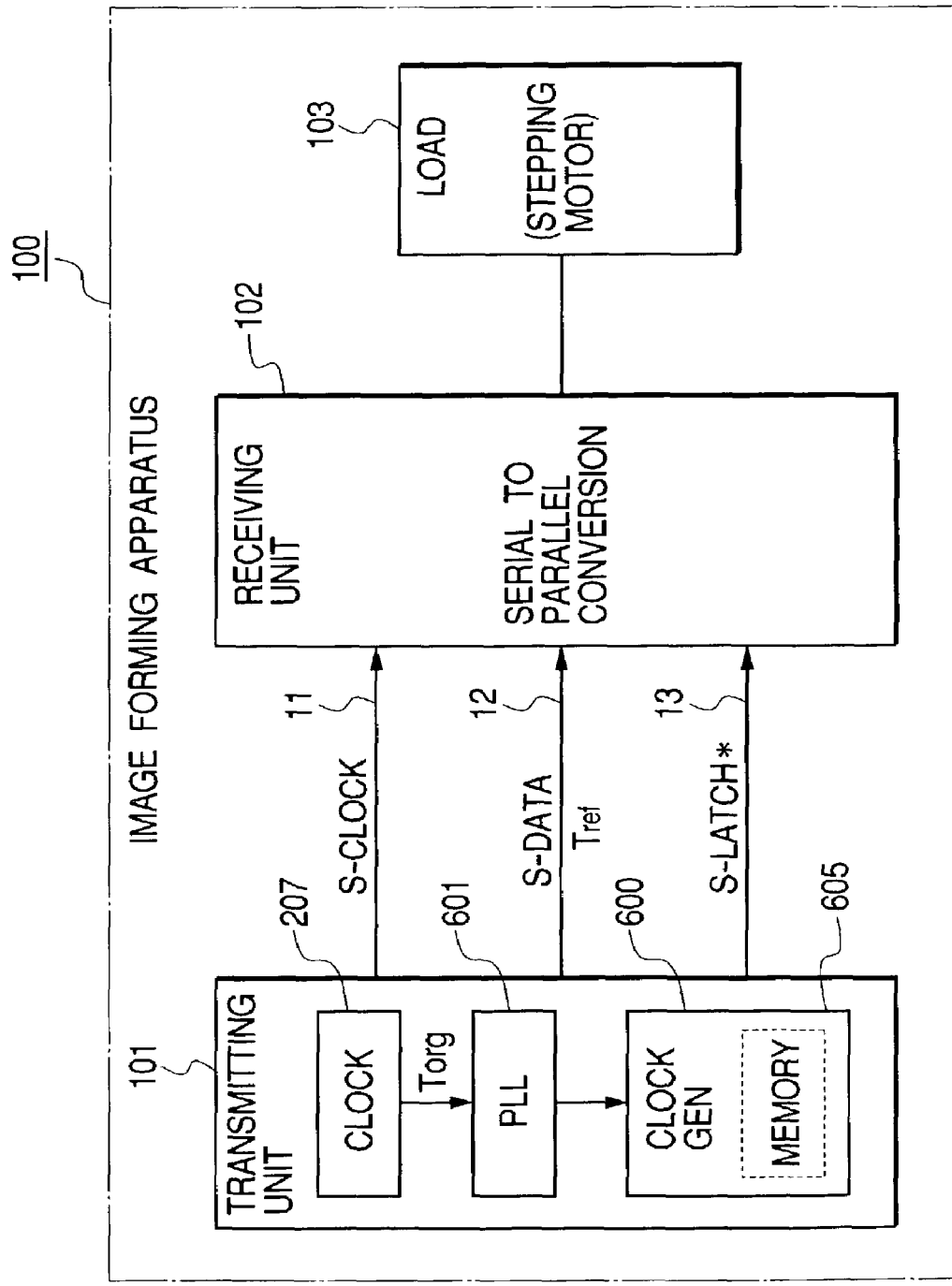
FIG. 1 is a block diagram showing an example of the construction of a communication system including a transmitting apparatus and a receiving apparatus in an image forming apparatus which is an embodiment of the present invention.

An embodiment of the present invention will hereinafter be described in detail with reference to the accompanying drawings. Throughout the drawings, members given like reference characters represent like members and need not be described again.

(System Construction)

FIG. 1 shows an embodiment of a data communicating apparatus according to the present invention. Here, it shows the construction of a communication system incorporated in an image forming apparatus 100 typified by a copying machine or a printer. This communication system is comprised of a transmitting apparatus 101 on a side for transmitting data, and a receiving apparatus 102 on a side for receiving the data. The receiving apparatus 102 has connected thereto a load 103 driven on the basis of the received data. The apparatuses 101 and 102 are connected together by communication lines 11, 12 and 13 for serial data communication. The communication lines 11 to 13 are comprised of the following three lines. The communication line 11 is S-CLOCK as a communication clock signal indicative of a clock for effecting synchronous communication. The communication line 12 is S-DATA as a serial data signal indicative of data transferred in synchronism with S-CLOCK. The communication line 13 is S-LATCH* as a reception timing signal indicative of the timing for receiving S-DATA which becomes effective on the receiving apparatus 102 side. The data transfer from the transmitting apparatus 101 comes to be effected whenever S-CLOCK is outputting a clock signal, but whether the receiving apparatus 102 receives the data is determined by S-LATCH*. Even when such a stepping motor that controls rotation by supplying a particular pulse at each constant interval is connected as the load 103 on the receiving apparatus 102 side, stable rotation can be obtained if the transmitting apparatus 101 side effects communication processing so as to generate S-LATCH* at a constant interval.

(Construction of the Present Invention)

Figure 2:
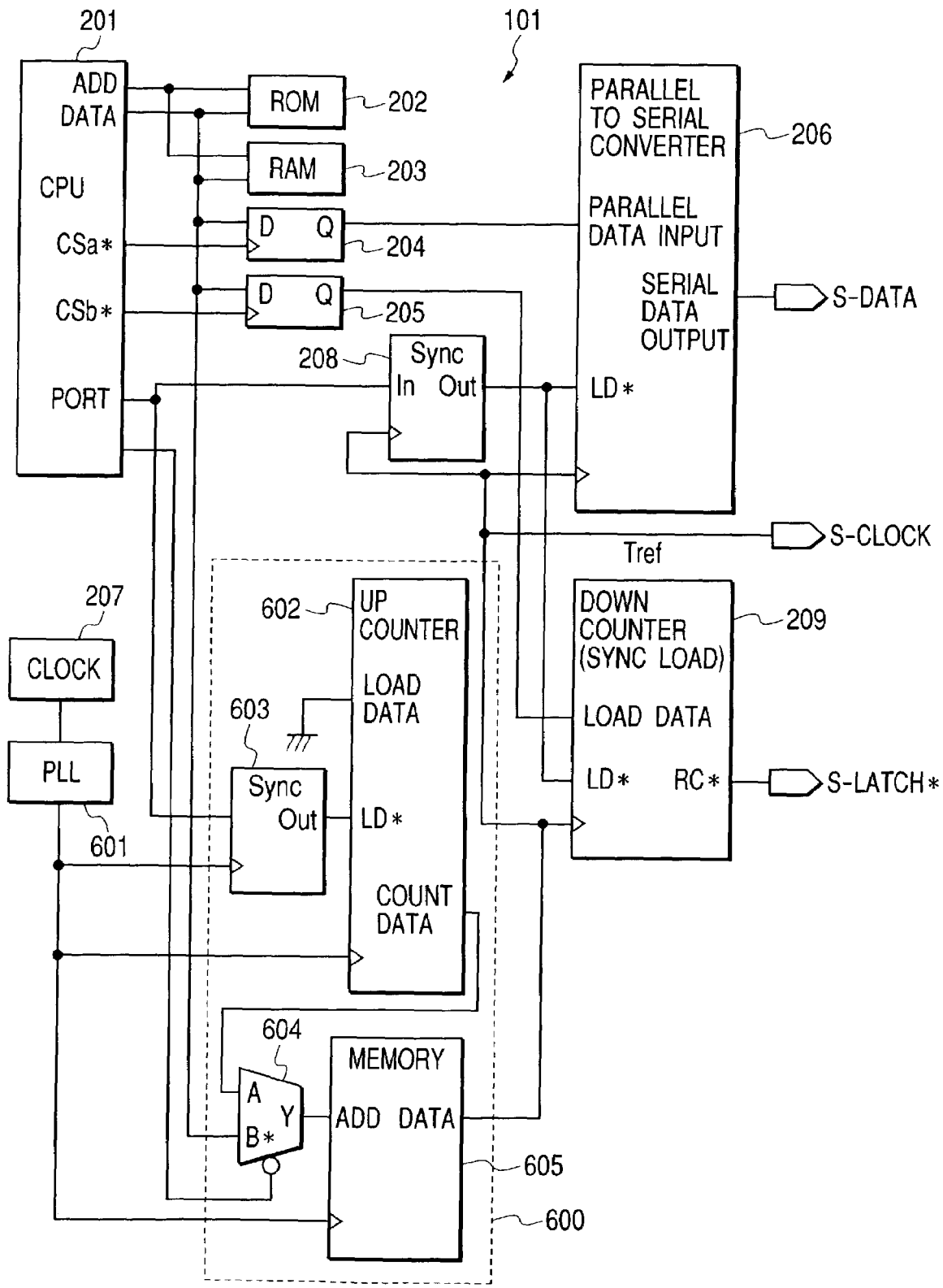
FIG. 2 is a block diagram showing the internal construction of the receiving apparatus.

FIG. 2 shows the internal circuit of the transmitting apparatus 101. In the present embodiment, in synchronizing type serial communication effected from the transmitting apparatus 101 to the receiving apparatus 102 with the communication clock signal S-CLOCK, the serial data signal S-DATA synchronized with the communication clock signal S-CLOCK, and the reception timing signal S-LATCH* indicative of the reception timing of communication data by the receiving apparatus 102, the clock of CLOCK 207 which is a basic clock signal is not directly used as S-CLOCK, but a particular clock of which the frequency varies is generated and newly used as S-CLOCK. Specifically, in the transmitting apparatus 101 shown in FIG. 2, there are provided PLL circuit 601 as a high-speed clock generating portion which is a reference clock generating portion, and a clock generating circuit 600 as a timing signal generating portion. The PLL circuit 601 has the function of generating high-speed clocks up to $2^m$ times (m being a positive integer) by the use of a basic clock generated by CLOCK 207 as a basic clock circuit. The clock generating circuit 600 has the function of generating a communication clock signal and a reception timing signal as independent clocks of any time length with using the high-speed clock signals generated by the PLL circuit 601 as the smallest unit. This clock generating circuit 600 is such that when the period of the basic clock signal is defined as Torg, and the period of the reception timing signal is defined as Tref, and the period of the communication clock signal is defined as Ti, the reception timing signal is outputted when the basic clock signal has been counted n times, and is represented as $$n = \frac{Tref}{Torg}.$$

The period Ti of the communication clock signal is represented as $$Ti = Torg\left(1 + \frac{ki}{2^m}\right);$$

ki being an integer, by adding or subtracting the period of a plurality of the generated high-speed clock signals to or from the period Torg of the basic clock signal. The total of the added or subtracted time, when seen through one period of the reception timing signal, is chosen so as to become 0 as represented by $$0 = \sum_{i=1}^{n} ki.$$

Also, in the present system, a limit value may be provided for the ki value determining the addition or subtraction of the high-speed clocks so that the ratio between the period Ti of the communication clock signal and the period Torg of the basic clock may not be below a predetermined reference value. Further, as regards the communication clock signal, the time S from the rising edge thereof to the falling edge thereof is constant as $$S = \frac{Torg}{2},$$

and the time varied by the ki value determining the addition or subtraction of the high-speed clocks may be restricted to the time from the falling edge to the rising edge.

The relation among the period Torg of the basic clock signal, the period Tref of the reception timing signal and the period Ti of the communication clock signal is stored as a data pattern in a memory 605.

Description will now be made of the construction of each portion in the transmitting apparatus 101 of FIG. 2. On the basis of a clock from CLOCK 207, a high-speed clock (hereinafter referred to as PLL-CLOCK) is generated by the PLL circuit 601. The clock generated by the PLL circuit 601 is $2^m$ (m being a positive integer) as great as an inputted source clock. PLL-CLOCK is used as the operating clock of an up counter 602. The up counter 602 is a counter for counting up from 0 after loading, and load timing is such that loading is started by a signal obtained by a transmission starting original signal (reception timing signal) outputted from the port of a CPU 201 being synchronized with PLL-CLOCK by SYNC circuit 603 as a synchronizing circuit. The count value of the up counter 602 is passed through a selector 604, and thereafter is inputted to an address of the memory 605.

The memory 605 is a memory designed to have data of 1 bit therein for each address, and outputs data of "0" or "1" in accordance with the inputted address. The data pattern in the memory 605 is pre-written before the start of serial data transmission after changing-over by the selector 604 to the CPU bus side. Thereafter, the data output of the memory 605 is utilized as the basic clock of serial communication to operate SYNC circuit 208, a parallel/serial conversion circuit 206 and a down counter 209 as in the prior art, whereby serial communication is established. The data pattern stored in the memory 605 is determined on the basis of the following rules:

period of the reception timing signal
(transmission starting original signal): Tref
period of the basic clock (CLOCK 207): Torg
total number of clocks in one cycle of
transmission: n
period of the communication clock signal
(S-CLOCK): Ti $$n = \frac{Tref}{Torg}.$$

$$Ti = Torg\left(1 + \frac{ki}{2^m}\right);$$

ki being an integer.

As described above, m is indicative of a constant multiple of PLL circuit 601.

As a result, ki becomes a coefficient indicative of the fluctuating state of the frequency of S-CLOCK being transmitted. In the present embodiment, ki is defined as follows: sum total of the coefficient ki:

$$0 = \sum_{i=1}^{n} ki$$

Even if the fluctuation of the frequency is effected so that radiant electric wave noise or the like may be reduced, ki is defined so that the number of clocks in one period of Tref which is the reference may be equal at each time and therefore, no error occurs to the data renewal timing on the receiving apparatus side.

(System Operation)

The operation of the present system will now be described. Here, description will be made with a case where the constant multiples of CLOCK, PLL-CLOCK and PLL are prescribed as follows taken as an example.

Torg=1 μsec. (CLOCK 207=1 MHz)
Tref=0.5 msec.
m=4 (PLL-CLOCK=16 MHz)

The total number n of clocks in one cycle of transmission becomes as follows:

$$n = \frac{500}{1} = 500$$

When 500 clocks exist in one cycle of transmission, $500*2^4=8000$ and thus, it will suffice if the capacity of the memory 605 satisfies 1*8000 Bits.

FIGS. 3 and 4 show examples of the data patterns written into the memory 605 under the above-mentioned capacity condition.

Table 1 of FIG. 3 is an example of a case where the same clock as CLOCK 207 to which the fluctuation of the frequency is not applied is outputted.

Table 2 of FIG. 4 is an example of a case where ki is defined as follows:

Coefficient ki=+1, +2, −1, −2, 0, 0, +1, +2, −1, −2, . . .

FIG. 4 shows 160 data of 8000 data, and ki is defined so that the total of ki may be 0 at a point of time whereat 160 data are terminated. In this manner, ki is defined so that the total thereof may also be 0 at a point of time whereat 8000 data are terminated. Also, Table 2 is an example of a case where ki is defined so as to maintain a clock duty 50%. The clock duty is never fixed at 50%. Depending on conditions, it is also possible that the same "H" hours as the "H" hours of CLOCK 207 is maintained and "L" hours alone is changed. Also, the maximum value of the coefficient is not limited to ±2. All is determined by whether there is a surplus in the reception timing on the receiving apparatus 102 side.

FIGS. 5A and 5B show S-CLOCK waveforms 711 and 712 corresponding to Table 1 and Table 2, respectively. The S-CLOCK waveform 711 of FIG. 5A has a constant period T0, while the S-CLOCK waveform 712 of FIG. 5B has varying periods T1, T2, T3, . . . From this, it will be seen that the S-CLOCK waveform 712 of Table 2 of FIG. 5B, as compared with the S-CLOCK waveform 711 of Table 1 of FIG. 5A, varies in frequency. In this manner, the fluctuation of the frequency becomes possible.

Figure 6A:
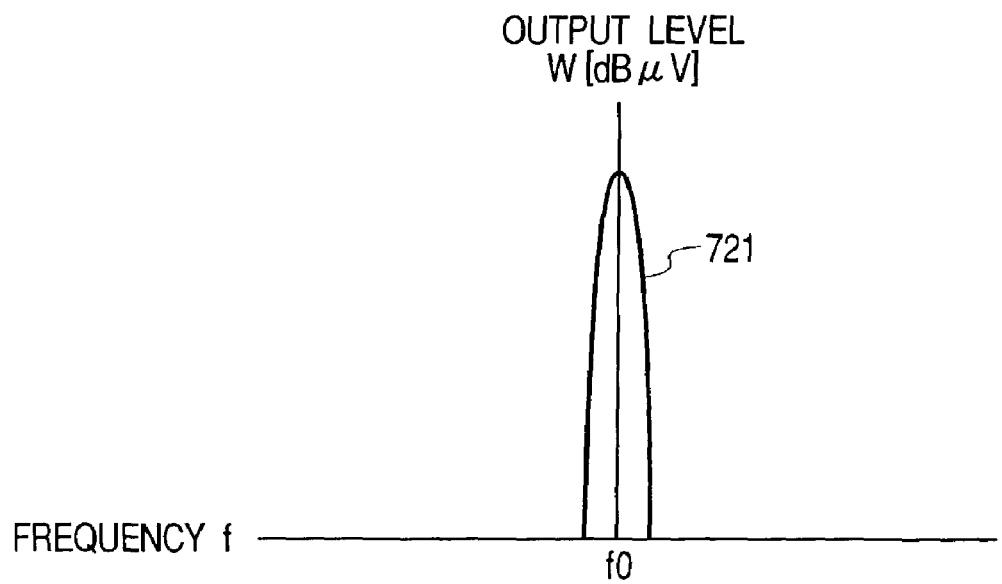
FIGS. 6A and 6B are waveform graphs showing spectrum intensity waveforms corresponding to FIGS. 5A and 5B in the cases of Table 1 and Table 2.
Figure 6B:
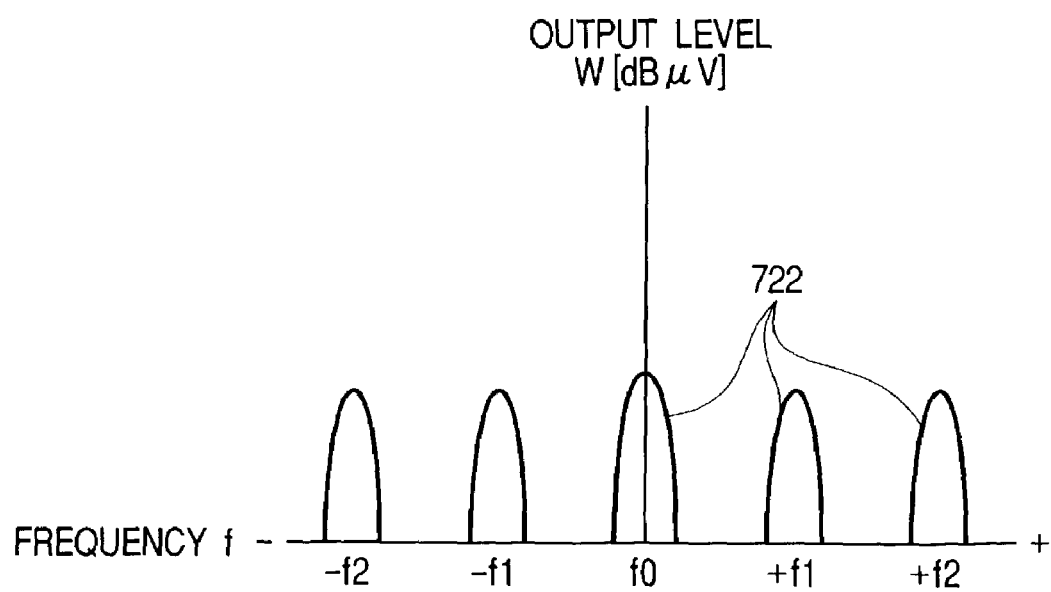
Figure 7:
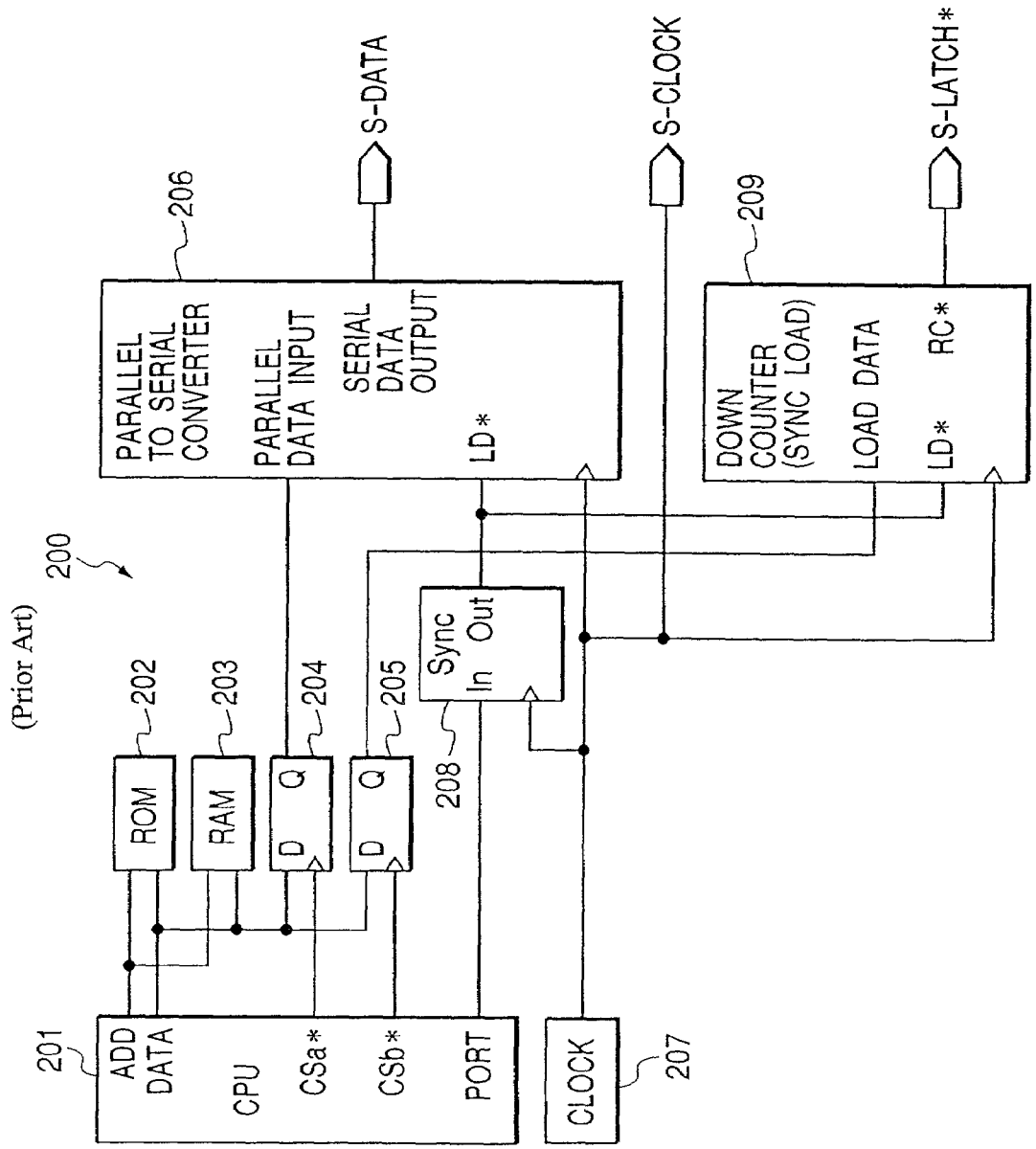
FIG. 7 is a block diagram showing the internal construction of a conventional transmitting apparatus.
Figure 8:
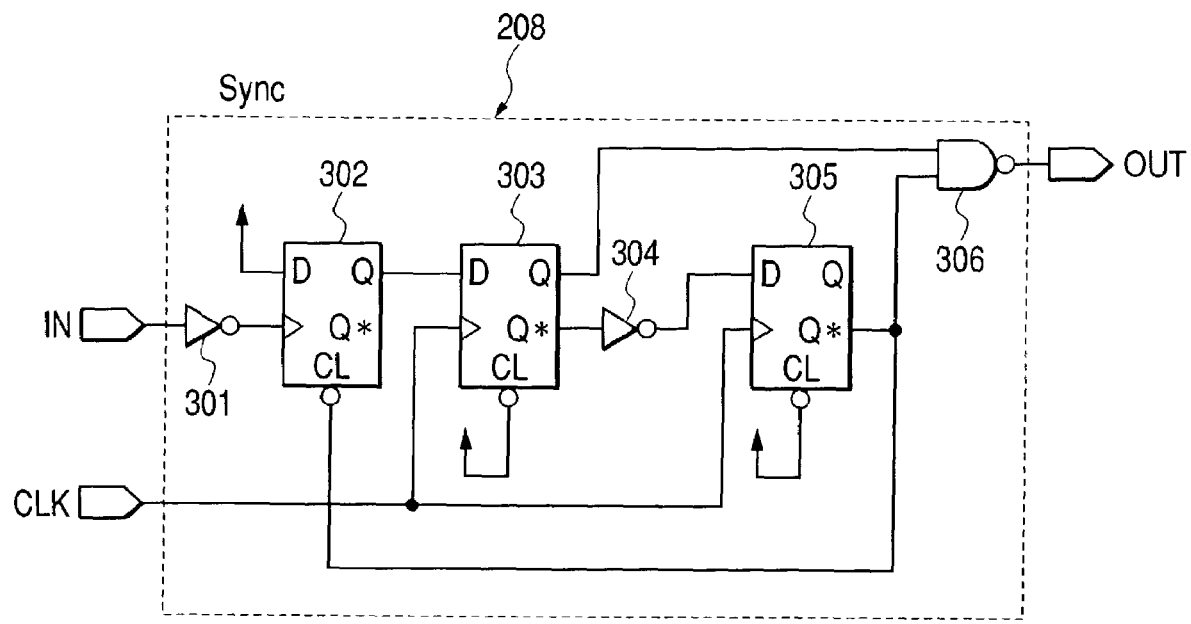
FIG. 8 is a block diagram showing the construction of a SYNC circuit.
Figure 9:
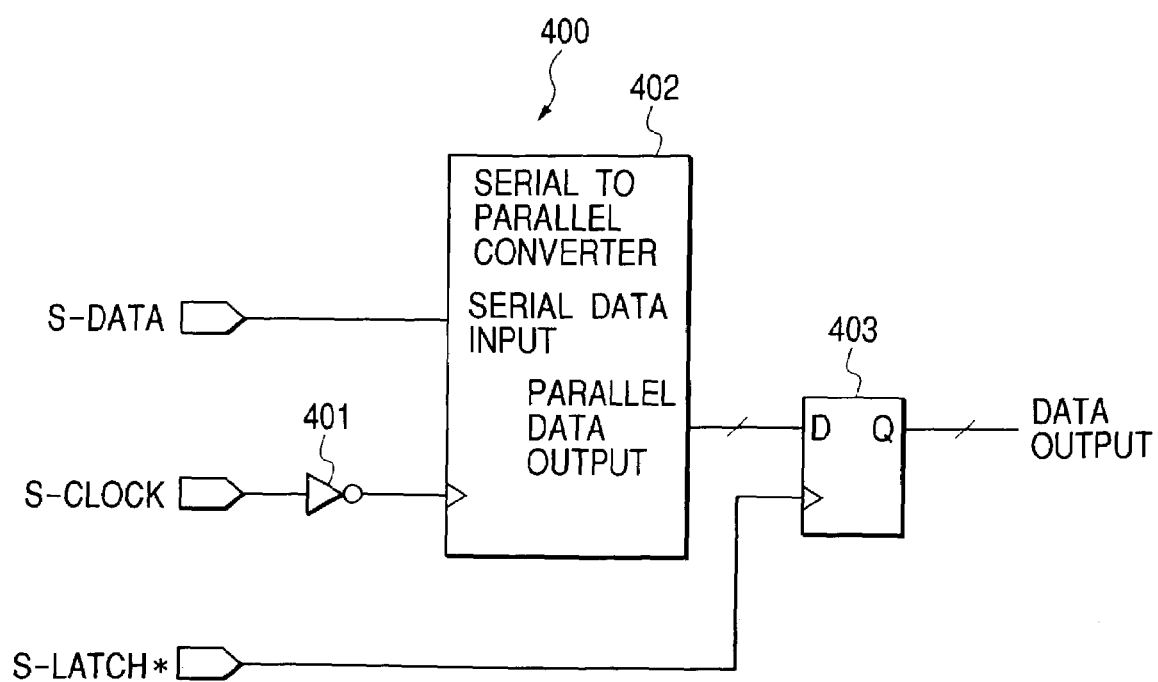
FIG. 9 is a block diagram showing the internal construction of the receiving apparatus.
Figure 10:
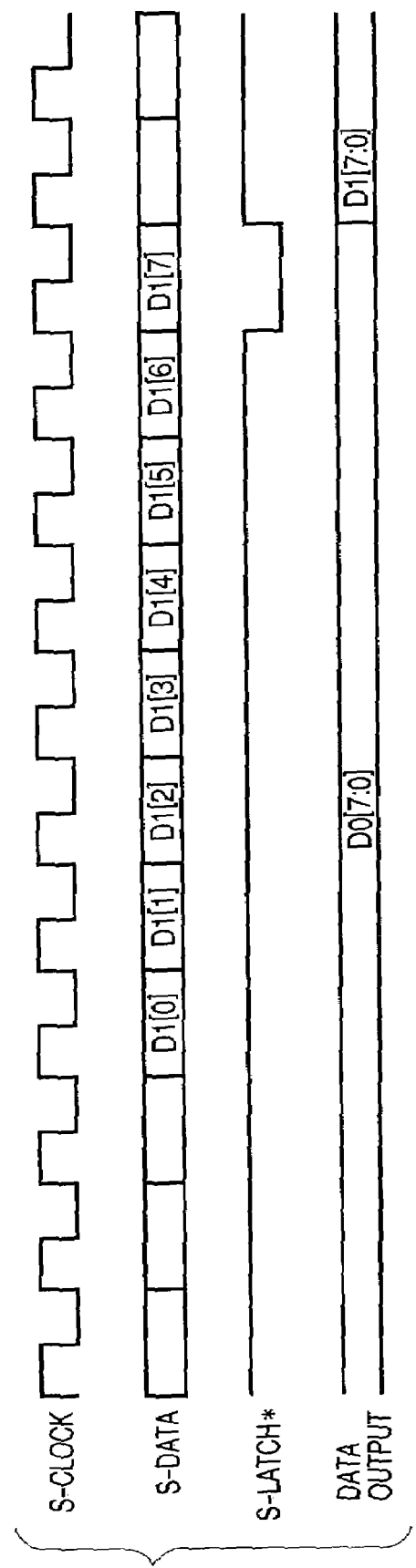
FIG. 10 is a timing chart showing examples of signals used in the communication between the transmitting apparatus of FIG. 7 and the receiving apparatus of FIG. 9.
Figure 11:
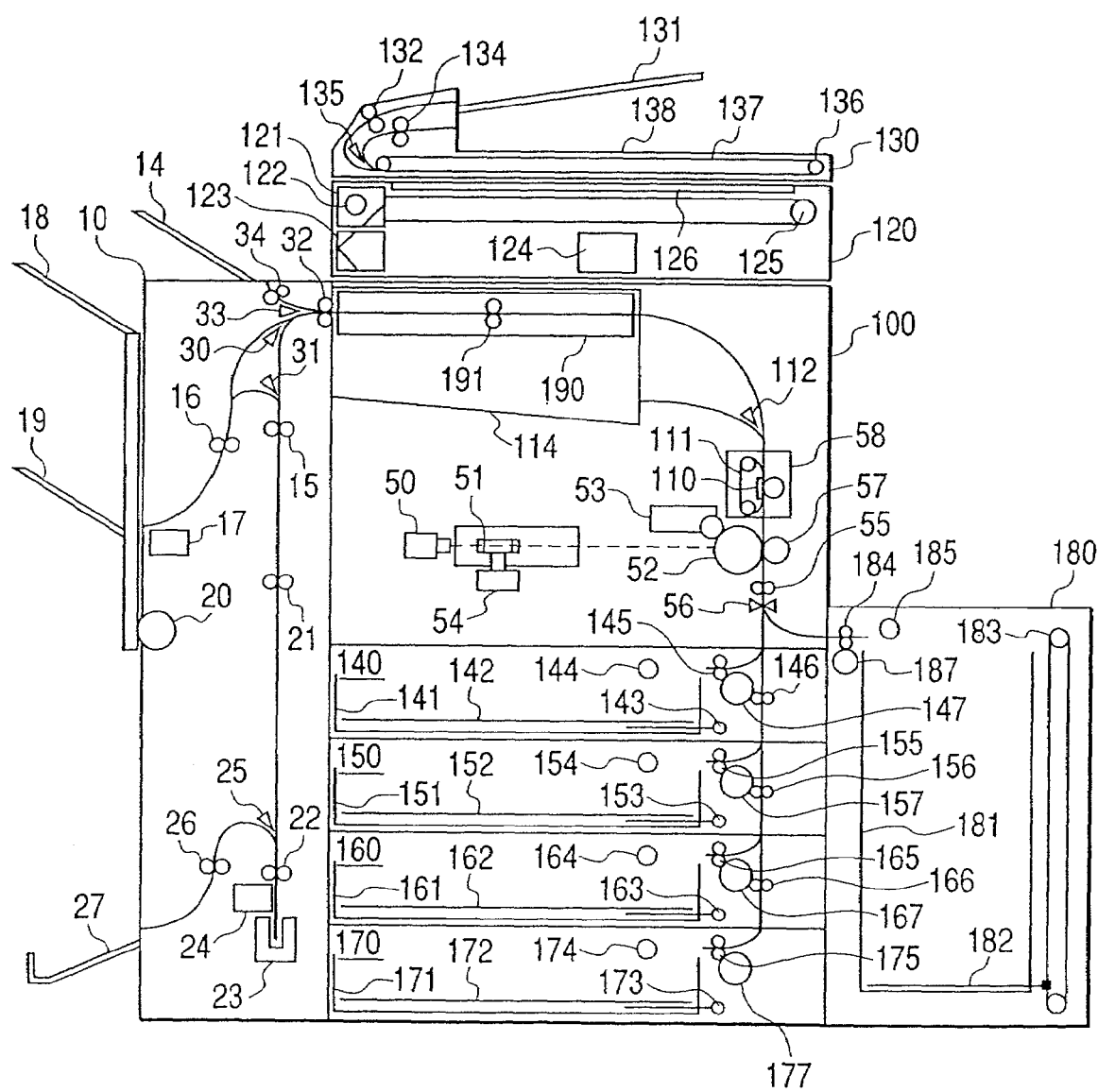
FIG. 11 is a cross-sectional view of a digital copying machine as an image forming apparatus.

FIGS. 6A and 6B show comparative examples of radiant electric wave noise radiated from the clock line of serial data communication. Here is shown spectrum intensity 721 and 722 of the S-CLOCK waveforms 711 and 712 at a particular high harmonic wave f0. The spectrum intensity 721 of the frequency f0 of FIG. 6A corresponds to the S-CLOCK waveform 711 of the period T0 of FIG. 5A. The spectrum intensity 722 of the frequencies f0, ±f1 and ±f2 of FIG. 6B corresponds to the S-CLOCK waveform 712 of the periods T1, T2 and T3 of FIG. 5B. In the state of Table 1, clocks of the same frequency are outputted at all times and therefore, the spectrum intensity of f0 becomes high. As compared with this, at the spectrum intensity 722 of Table 2, the frequency which becomes a peak is dispersed. In the example shown in FIG. 6B, the frequency is dispersed into −f2, −f1, 0, +f1 and +f2 and therefore, the spectrum waveform 722 is dispersed into five peaks. The number of times of the same frequency within a constant period (Tref) decreases, and therefore, as a matter of course, the peak value of the spectrum also decreases more remarkably than in the case of Table 1. Thereby, an improvement in the radiant electric wave noise level is obtained. From the foregoing description, the communication clock signal for transmission (S-CLOCK) is generated so that the frequency thereof may fluctuate, whereby the radiant electric wave noise can be reduced, and even when the output data is varied at a predetermined time interval on the receiving apparatus 102 side, or even in the case of serial communication using a clock of which the frequency fluctuates, a data output can be obtained at desired constant timing on the receiving apparatus 102 side.

The present invention may be applied to a system comprised of a plurality of apparatuses (e.g. a host computer, an interface apparatus, a reader, a printer, etc.), or a standalone apparatus comprising an instrument (e.g. a compact image processing instrument like a PDA (personal data administration) instrument, a copying machine or a facsimile apparatus). Also, the present invention can of course be applied to a case where it is achieved by supplying a program to a system or an apparatus. It also becomes possible to enjoy the effect of the present invention by supplying a system or an apparatus with a storing medium storing therein a program represented by software for achieving the present invention, and causing the computer (or the CPU or the MPU) of the system or the apparatus to read out and execute the program code stored in the storing medium. In this case, the program code itself read out from the storing medium realizes the function of the aforedescribed embodiment, and the storing medium storing the program code therein constitutes the present invention. As the storing medium for supplying the program code, use can be made, for example, of a floppy (registered trademark) disc, a hard disc, an optical disc, a magneto-optical disc, CD-ROM, CD-R, a magnetic tape, a nonvolatile memory card (IC memory card), a ROM (such as a mask ROM or a flash EEPROM) or the like. Of course, the present invention also covers a case where a program code read out by a computer is executed, whereby not only the function of the aforedescribed embodiment is realized, but on the basis of the instructions of the program code, an OS (operating system) or the like working on the computer carries out part or the whole of actual processing, and the function of the aforedescribed embodiment is realized by the processing.

Further, of course, the present invention also covers a case where a program code read out from a storing medium is written into a memory provided in a function extension board inserted in a computer or a function extension unit connected to a computer, whereafter on the basis of the instructions of the program code, a CPU or the like provided in the function etension board or the function extension unit carries out part or the whole of actual processing, and the function of the aforedescribed embodiment is realized by the processing.

What is claimed is:

1. A data communicating apparatus for synchronizing a communication clock signal for the transmission of data and a reception timing signal by which a receiving apparatus receives said data, with each other, and effecting synchronizing-type serial data communication, comprising:
   a reference clock generating portion for generating a reference clock signal;
   a high-speed clock generating portion for generating a high-speed clock signal on the basis of the reference clock signal; and
   a timing signal generating portion for generating said communication clock signal and said reception timing signal on the basis of said reference clock signal as independent clocks of any time length by using said generated high-speed clock signal as the smallest unit,
   wherein said timing signal generating portion varies a frequency of said communication clock signal on the basis of a coefficient which is so defined that the summation of the coefficient over one period of said reception timing signal is equal to zero.

2. A data communicating apparatus according to claim 1, wherein the one period of said reception timing signal is constant.

3. A data communicating apparatus according to claim 1 wherein said reception timing signal is a signal output when said high-speed clock signal has been counted N times.

4. An image forming apparatus having a transmitting apparatus and a receiving apparatus, and capable of transmitting a plurality of data between said apparatuses by serial communication, characterized in that said transmitting apparatus is a data communicating apparatus according to claim 1, and said receiving apparatus receives a serial data signal transmitted from said transmitting apparatus, by the use of said reception timing signal transmitted from said data communicating apparatus.

5. A data communicating method of synchronizing a communication clock signal for the transmission of data and a reception timing signal by which a receiving apparatus receives said data, with each other, and effecting synchronizing-type serial data communication, comprising:
   a reference clock generating step of generating a reference clock signal;
   a high-speed clock generating step of generating a high-speed clock signal on the basis of the reference clock signal; and
   a timing signal generating step of generating said communication clock signal and said reception timing signal on the basis of said reference clock signal as independent clocks of any time length by using said generated high-speed clock signal as the smallest unit,
   wherein said timing signal generating step varies a frequency of said communication clock signal on the basis of a coefficient which is so defined that the summation of the coefficient over one period of said reception timing signal is equal to zero.

6. A data communicating method according to claim 5, wherein the one period of said reception timing signal is constant.

7. A data communicating method according to claim 5, wherein said reception timing signal is a signal output when said high-speed clock signal has been counted N times.

8. A data communicating apparatus for transmitting a plurality of data by serial communication, provided with:
   a high-speed clock generating portion for generating high-speed clock signals up to $2^m$ times (m being a positive integer) on the basis of a basic clock signal by the use of a communication clock signal for transmission, a communication data signal synchronized with said communication clock signal, and a reception timing signal indicative of the reception timing of said communication data signal; and
   a timing signal generating portion for generating said communication clock signal and said reception timing signal as independent clocks of any time length with using said generated high-speed clock signal as the smallest unit,
   wherein said timing signal generating portion is such that when the period of said basic clock signal is defined as Torg, and the period of said reception timing signal is defined as Tref, and the period of said communication clock signal is defined as Ti, said reception timing signal is output when said basic clock signal has been counted n times, and is represented as $$n = \frac{Tref}{Torg}$$

and the period Ti of said communication clock signal is represented as $$Ti = Torg\left(1 + \frac{ki}{2^m}\right);$$

ki being an integer, by adding or subtracting the period of a plurality of said generated high-speed clock signals to or from the period Torg of said basic clock signal, and the total of the added or subtracted time, when seen through one period of said reception timing signal, is chosen so as to become 0 as represented by $$0 = \sum_{i=1}^{n} ki.$$

9. A data communicating apparatus according to claim 8, wherein a limit value is provided for the ki value determining the addition or subtraction of said high-speed clocks so that the ratio between the period Ti of said communication clock signal and the period Torg of said basic clock signal may not be below a predetermined reference value.

10. A data communicating apparatus according to claim 8, wherein said communication clock signal is such that the time S from the rising edge thereof to the falling edge thereof is constant as $$S = \frac{Torg}{2}$$

and the time varied by the ki value determining the addition or subtraction of the high-speed clock is restricted to the time from the falling edge to the rising edge.

11. A data communicating apparatus according to any one of claims 8 to 10, wherein the relation among the period Torg of said basic clock signal, the period Tref of said reception timing signal and the period Ti of said communication clock signal is stored as a data pattern in a storing portion.

12. An image forming apparatus having a transmitting apparatus and a receiving apparatus, and capable of transmitting a plurality of data between said apparatuses by serial communication, characterized in that said transmitting apparatus includes a data communicating apparatus according to claim 8, and said receiving apparatus receives a serial data signal transmitted from said transmitting apparatus, by the use of said reception timing signal transmitted from said data communicating apparatus.

13. A data communicating method of transmitting a plurality of data by serial communication, comprising:

a high-speed clock generating step of generating high speed clock signals up to 2m times (m being a positive integer) on the basis of a basic clock signal by the use of a communication clock signal for transmission, a serial communication data signal synchronized with said communication clock signal, and a reception timing signal indicative of the reception timing of said communication data signal; and the clock generating step of generating said communication clock signal and said reception timing signal as independent clocks of any time length with using said generated high-speed clock signals as the smallest unit, wherein that when the period of said basic clock signal is defined as Torg, and the period of said reception timing signal is defined as Tref, and the period of said communication clock signal is defined as Ti, said reception timing signal is outputted when said basic clock signal has been counted n times, and is represented as $$n = \frac{Tref}{Torg}$$

and the period Ti of said communication clock signal is represented as $$Ti = Torg\left(1 + \frac{Ki}{2^m}\right);$$

ki being an integer, by adding or subtracting the period of a plurality of said generated high-speed clock signals to or from the period Torg of said basic clock signal, and the total of the added or subtracted time, when seen through one period of said reception timing signal, is chosen so as to become 0 as represented by $$0 = \sum_{i=1}^{n} ki.$$

14. A data communicating method according to claim 13, wherein a limit value is provided for the ki value determining the addition or subtraction of said high-speed clock signals so that the ratio between the period Ti of said communication clock signal and the period Torg of said basic clock signal may not be below a predetermined reference value.

15. A data communicating method according to claim 13, wherein that said communication clock signal is such that the time S from the rising edge thereof to the falling edge thereof is constant as $$S = \frac{Torg}{2}$$

and the time varied by the ki value determining the addition or subtraction of the high-speed clock signals is restricted by the time from the falling edge to the rising edge.

* * * * *